July 9, 1929.                M. J. BOYLE                1,720,316
VALVE CONSTRUCTION
Filed Jan. 7, 1928
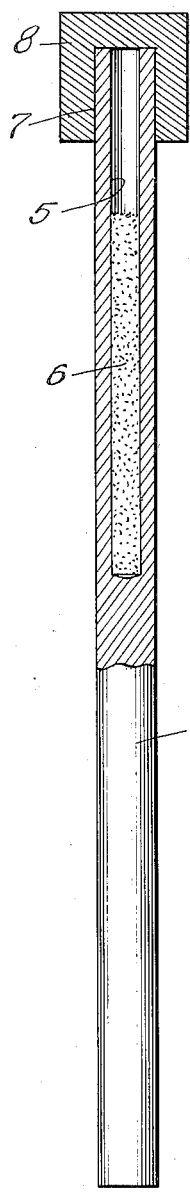
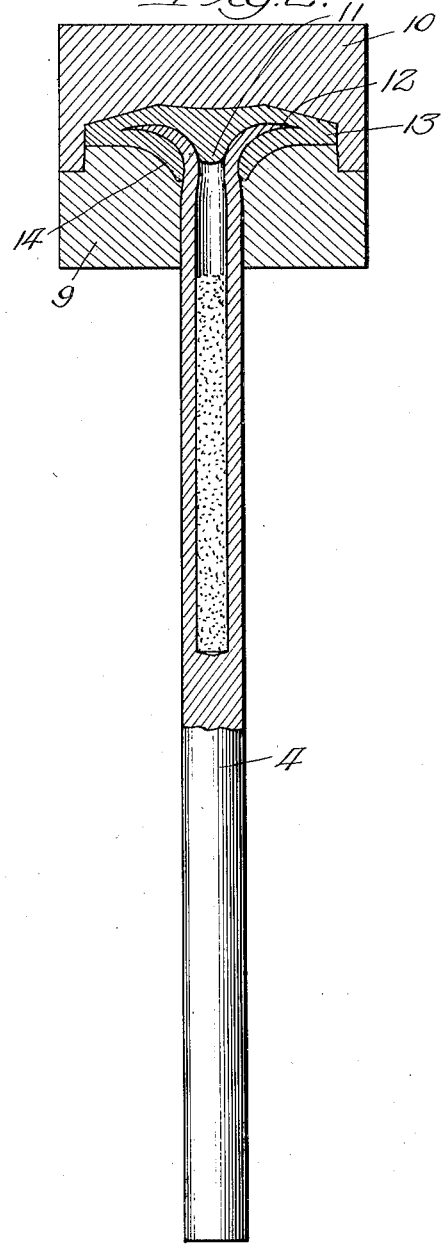
Inventor:
Michael J. Boyle,
By Glenn S. Noble
Atty Patented July 9, 1929.

1,720,316

UNITED STATES PATENT OFFICE.

MICHAEL J. BOYLE, OF CHICAGO, ILLINOIS.

VALVE CONSTRUCTION.

Application filed January 7, 1928. Serial No. 245,131.

This invention relates to valves or similar articles having stems provided with heads and is particularly directed to two-piece valves for internal combustion engines. The desirability of valves with hollow or tubular stems and stems of this kind having heat dissipating material therein is well recognized, but valves of this character have heretofore been expensive to manufacture and more or less unsatisfactory in operation on account of leakage of the heat dissipating salts or material.

As heretofore made, the stem has usually been drilled from the lower end to the head and then the lower end plugged after the salt or heat transferring material was placed therein. The drilling of a small hole through a long stem is very expensive and difficult, and the plugs at the end are likely to work loose or permit leakage of the heat transferring material. In accordance with the present invention, I avoid such objectionable features by drilling the stem from the top which only requires a relatively short hole as it is only necessary for the hole to extend down to approximately the bottom of the guide. After the hole has been drilled, and the heat transferring material placed therein the head is applied, which is secured in such a manner that it is not only rigidly attached to the stem but also closes the hole in the end of the stem.

As thus indicated, the objects of this invention are to provide an improved valve or the like; to provide a two-piece valve having a hollow stem; to provide a valve having a hollow stem and having novel closing means for the end of the stem; to provide a hollow valve with heat transferring material therein and having a head applied thereto which also serves to close the end of the hole; and to provide a suitable method of making a device of the character indicated.

As shown in the accompanying drawings illustrating one form of this invention;

Figure 1 is a longitudinal sectional view showing the stem with the hole bored therein and inserted in a billet; and Figure 2 is a similar view showing the completed valve with the dies for forming the same;

As shown in these drawings, the stem 4, which is made of any suitable material for this purpose, is provided with a hole 5 in the upper end, which is preferably drilled therein. Any suitable substance for transferring heat may be placed in the hole, as shown at 7, such substance preferably comprising a salt or the like that will turn to liquid under the heat generated in the stem under the usual working conditions. The quantity of such material placed in the hole is preferably such that the hole will be only partially filled and sufficient space is left at the top so that the salt or material will not interfere with the forging and welding operation.

The end of the stem is inserted in a hole 7 in a billet 8 which is made of suitable shape and material for forming the head or valve proper. When this is done, the billet and adjacent portion of the stem are heated to the necessary high temperature for the forming of the valve head and welding it to the stem. After the parts have thus been heated, the stem and billet are placed in a die 9, as shown in Figure 2, which coacts with a die 10 in order to complete the forming operation, and the joining or welding of the head to the stem. When this operation is completed, it will be seen that the central portion of the head is forced into the stem in the form of a plug or closure 11, and the upper end of the stem is spread out or mushroomed into the form of an annular tapered flange or fin 12 which is intimately united with or welded to the adjacent portions of the completed head 13.

From this description it will be seen that when the valve is completed the hollow stem is securely closed so that the heat transferring or dissipating material cannot escape therefrom.

Furthermore, such valves may be manufactured at a comparatively low cost, and the head and stem may each be formed of such materials as desired for the work to be performed. It will also be noted that the welding of the head to the stem will in most cases be limited to the outer area or periphery of the flange 12 so that the lower neck portion 14 of the head which engages with the stem will not be rigidly united therewith. As a consequence the head may have a slight yielding or cushioning effect at the time of impact with the motor block or valve seat, thereby saving wear on these parts and insuring better operation.

It will also be noted that my improved valves may be made in different forms or styles for different engines or for other purposes, and therefore I do not wish to be limited to the exact arrangement, construction, or method herein shown or described, except as specified in the following claims, in which I claim:

1. A valve of the character set forth, comprising a stem having an axial hole extending inwardly from the head end, a non-solid heat carrying material in said hole, and a head fixed to the end of the stem and forming a closure for said hole.

2. A valve comprising a stem having a hole extending downwardly from the upper end for a predetermined distance, the upper end of the stem being expanded to form a flange, a salt in said hole, and a head portion enclosing said flange and adjacent portion of the stem and also forming a closure for the end of the hole.

3. A headed article comprising a stem having a hole extending inwardly from the upper end thereof, said end being provided with an annular tapered flange, a heat transferring material in said hole, and a head formed of another piece of metal enclosing said flanged end of the stem and welded thereto and also closing the end of the hole.

4. An article of manufacture comprising a disk-like head portion, and a stem portion, the stem having a hole extending inwardly from the head portion and having a heat transferring salt or the like enclosed therein.

MICHAEL J. BOYLE.